Patented Oct. 10, 1933

1,929,934

UNITED STATES PATENT OFFICE 1,929,934

WAX TREATMENT

Albert G. Peterkin, Jr., Bryn Mawr, Pa., and Lloyd B. Smith, Moorestown, N. J., assignors to The Atlantic Refining Company, Philadelphia, Pa., a corporation of Pennsylvania No Drawing. Application May 31, 1930
Serial No. 458,904

3 Claims. (Cl. 196—20)

The present invention relates to separation into one or more components of a substance comprising portions of different fusibility, more particularly to the separation of oil from wax and/or low melting wax from higher melting wax. This invention in certain respects, or at least in part, is an improvement over the process disclosed in U. S. Patent #400,042 to Bicknell, and hereinafter when "patent" is referred to, it is to be understood that such patent is meant.

Referring more in detail to a specific aspect of our invention, in the petroleum industry certain fractions are obtained from a number of the well-known crude petroleums, such as from the Mid-Continent and/or Pennsylvania crudes, which contain relatively large percentages of paraffin wax. To separate the paraffin wax from such petroleum fractions, the usual procedure is to chill, filter, then subject the wax to the well-known sweating process, wherein the wax from the filter press is placed in an oven the temperature of which is regulated so that oil and/or low melting wax sweat or exude and separate from the higher melting wax. The process disclosed in the patent differs from the usual practice in that it contemplates what may be called "water sweating", in which solid wax is surrounded by a body of water, the temperature of which is controlled, causing oil and/or low melting wax to sweat or exude, and being immiscible with and lighter or less dense than the water, such oil and/or wax rises to the surface of the water from which it may be removed, the higher melting solid wax remaining, retained and submerged in the body of water; thereby separation of the oil and/or low melting wax from the higher melting wax is effected.

In accordance with the present invention, sweating of a substance composed of portions of different fusibility, more particularly oil from wax and/or low melting wax from higher melting wax, is effected by surrounding the substance with a liquid immiscible with the substance or such portions of the substance as become liquid as the operation proceeds, the surrounding liquid having the property of particularly favoring the separation to be effected. The liquid employed in our process is characterized in that it will wash from that portion of the substance being treated which remains solid, the portion of the substance which becomes liquid or appears as liquid on the surface of the solid during the treatment. We recognize that the prior art, and in particular the "patent", discloses effecting sweating by surrounding substances to be sweated by water. Our invention contemplates, instead of water, surrounding the substance to be sweated with a liquid, which due to its characteristics is more suitable for such purpose in that more rapid sweating than if water were used may be effected. We have found that aqueous solutions of sodium silicate are particularly desirable for such purpose. In the case of these liquid solutions the surface effects are such that the oil and/or wax which melts will detach itself more readily from the higher melting solid wax crystals than it would if the surrounding liquid were water.

As an example of the advantage gained by proceeding in accordance with our invention, we have found as follows:

Upon taking two cakes of the same weight and volume of so-called slack wax of 102° F., melting point, and submerging one each of the cakes in water, and in an 8 per cent aqueous solution of sodium silicate, and maintaining the temperatures of the two bodies of liquid at 80° F., after twelve hours, using the volume of oil which formed a layer on the surface of the water as unity for purposes of comparison, it was found that the volume of oil which separated over the silicate solution was 3.3. After forty-three hours it was found that for 100 parts of oil which separated over the water, 200 parts separated over the silicate solution.

From these comparisons it is quite apparent that material advantage is gained over the water sweating process as disclosed in the patent above mentioned, by, instead of water, effecting such sweating by submerging the wax cake in a body of liquid having the characteristics aforesaid.

It is to be understood that we contemplate broadly effecting sweating of a substance comprising portions of different fusibility, more particularly oil and/or low melting wax from higher melting wax, by surrounding the substance to be sweated with a liquid which upon contacting therewith, will condition the surface of that portion of the substance which remains solid so that the oil and/or that portion of the wax which becomes liquid during the treatment will more readily detach itself from said surface than if said surrounding liquid were water, this plus the more specific contemplation of effecting the sweating in a surrounding medium comprising a solution of alkali silicates, and the still more specific contemplation of effecting the sweating using sodium silicate solution as the surrounding medium.

It is to be further understood that our invention is applicable in or to processes involving surrounding the substance to be treated with a liquid immiscible with liquid portions thereof formed as a result of fusion or otherwise, in or by which fractional sweating is effected by raising the temperature of the immiscible liquid gradually or from time to time, and segregating those fractions which separate within desired temperature ranges.

What we claim is:

1. A process for sweating oil and low melting mineral wax from higher melting mineral wax which comprises surrounding the crude wax cake to be sweated with a solution of alkaline silicates, and maintaining the surrounding solution at a temperature such that those portions of the oil and wax which are to be separated from the higher melting wax are in a liquid state and will exude therefrom.

2. A process for sweating oil and low melting mineral wax from higher melting mineral wax which comprises surrounding the crude wax cake to be sweated with a solution of sodium silicate, and maintaining the surrounding solution at a temperature such that those portions of the oil and wax which are to be separated from the higher melting wax are in a liquid state and will exude therefrom.

3. A process for sweating oils and low melting mineral wax from higher melting mineral wax which comprises surrounding the crude wax cake with a solution of sodium silicate, raising the temperature of the surrounding solution so that those portions of the oil and wax which are to be separated from higher melting wax are in a liquid state and will exude therefrom, and collecting portions which separate within desired temperature ranges.

ALBERT G. PETERKIN, Jr.
LLOYD B. SMITH.